US012736412B2

(12) United States Patent
Saecker

(10) Patent No.: US 12,736,412 B2
(45) Date of Patent: Sep. 15, 2026

(54) PROTECTIVE TUBE FOR CRYOGENIC APPLICATIONS

(71) Applicant: Endress+Hauser Wetzer GmbH+Co. KG, Nesselwang (DE)

(72) Inventor: Dietmar Saecker, Nesselwang (DE)

(73) Assignee: Endress+Hauser Wetzer GmbH+Co. KG, Nesselwang (DE)

(*) Notice: Subject to any disclaimer, the term of this patent is extended or adjusted under 35 U.S.C. 154(b) by 590 days.

(21) Appl. No.: 18/043,188

(22) PCT Filed: Jul. 16, 2021

(86) PCT No.: PCT/EP2021/070012
§ 371 (c)(1),
(2) Date: Feb. 27, 2023

(87) PCT Pub. No.: WO2022/042941
PCT Pub. Date: Mar. 3, 2022

(65) Prior Publication Data

US 2023/0314235 A1 Oct. 5, 2023

(30) Foreign Application Priority Data

Aug. 28, 2020 (DE) ..................... 10 2020 122 567.9

(51) Int. Cl.
*G01K 1/08* (2021.01)
*G01K 1/14* (2021.01)
(Continued)

(52) U.S. Cl.
CPC ................. *G01K 1/08* (2013.01); *G01K 1/14* (2013.01); *G01K 13/026* (2021.01); *G01K 13/006* (2013.01)

(58) Field of Classification Search
CPC ................................... G01K 1/08; G01K 1/14
(Continued)

(56) References Cited

U.S. PATENT DOCUMENTS 2,071,531 A * 2/1937 Hulme ................... G01K 1/125 374/E1.017
3,742,763 A * 7/1973 Sczerba ................... G01K 1/14 374/208

FOREIGN PATENT DOCUMENTS

CN 1985163 A1 6/2007
CN 207832329 U1 9/2018
(Continued)

OTHER PUBLICATIONS

Translation of DE3834245A1 (Year: 1990).*

*Primary Examiner* — Mirellys Jagan
(74) *Attorney, Agent, or Firm* — Christopher R. Powers; Endress+Hauser (USA) Holding, Inc.

(57) ABSTRACT

A protective tube for an apparatus for determining and/or monitoring a process variable of a medium in a containment includes a tubular element for receiving a measuring insert of the apparatus, wherein the tubular element is securable to the containment such that the tubular element extends inwardly into an internal volume of the containment, wherein the tubular element includes an inlet opening and an outlet opening arranged on mutually oppositely lying sides of the tubular element. The present disclosure relates, furthermore, to an arrangement for determining and/or monitoring a process variable of a medium in a containment, the arrangement including an apparatus for determining and/or monitoring the process variable with a measuring insert and a protective tube according to the present disclosure.

12 Claims, 3 Drawing Sheets

(51) Int. Cl.
*G01K 13/00* (2021.01)
*G01K 13/02* (2021.01)

(58) Field of Classification Search
USPC .................................................. 374/208, 148
See application file for complete search history.

(56) References Cited

FOREIGN PATENT DOCUMENTS

| | | | | | |
|---|---|---|---|---|---|
| CN | 210664803 | U1 | | 6/2020 | |
| DE | 2549619 | A1 | | 5/1977 | |
| DE | 3516815 | A1 | | 11/1986 | |
| DE | 8814056 | U1 | | 1/1989 | |
| DE | 3834245 | A1 | * | 4/1990 | ............ F27D 21/00 |
| DE | 102006029631 | A1 | | 1/2008 | |
| DE | 102013211479 | A1 | | 12/2014 | |
| DE | 102016123722 | A1 | | 6/2017 | |
| DE | 102017123504 | A1 | | 4/2018 | |
| DE | 102020109424 | A1 | | 10/2021 | |
| FR | 2516095 | A1 | * | 5/1983 | ........... C21C 5/4673 |
| JP | 2002310806 | A | * | 10/2002 | |

* cited by examiner

PROTECTIVE TUBE FOR CRYOGENIC APPLICATIONS

CROSS-REFERENCE TO RELATED APPLICATIONS

The present application is related to and claims the priority benefit of German Patent Application No. 10 2020 122 567.9, filed on Aug. 28, 2020, and International Patent Application No. PCT/EP2021/070012, filed Jul. 16, 2021, the entire contents of which are incorporated herein by reference.

TECHNICAL FIELD

The invention relates to a protective tube for an apparatus for determining and/or monitoring at least one process variable of a medium in a containment, as well as to an arrangement for determining and/or monitoring the process variable of the medium in the containment, comprising an apparatus for determining and/or monitoring the process variable with a measuring insert, which serves for determining and/or monitoring the process variable, and a protective tube of the invention. The containment is, for example, a container or a pipeline.

BACKGROUND

Protective tubes serve, for example, for introducing into a containment measuring inserts of field devices, which are used for determining and/or monitoring one or more, especially physical or chemical, process variables of a medium, especially a fluid. Protective tubes involve, in such case, as a rule, extending, at least partially, into the medium immersion bodies, which are embodied for receiving the measuring insert and have, for example, a central bore (which can be blind), into which the measuring insert is introducible. The protective tube fulfills, thus, in principle, the function of a housing. Protective tubes are, in such case, typically introduced into a nozzle of a container or a lateral port of a measuring tube, which is integratable into a pipeline.

By way of example, an application for protective tubes for field devices relates to protective tubes for thermometers, which, frequently, and, especially, in the case of an invasive temperature determination, are used to protect a measuring insert (containing a temperature sensor) from the medium being measured. Although the invention is also usable for other types of field devices, the following description relates, by way of example, to temperature measuring technology.

Thermometers are known in a wide variety of embodiments in the state of the art and their underlying measuring principles have been described there, in each case, at length. Thus, there are thermometers, which for measuring temperature use the expansion of a liquid, a gas or a solid of known coefficient of thermal expansion, or such, which relate the electrical conductivity of a material with the temperature, such as, for example, in the case of application of resistance elements or thermoelements. In contrast, in the case of radiation thermometers, especially pyrometers, the heat radiation of a substance is utilized for determining temperature.

In the case of a temperature sensor in the form of a so-called thin film sensor, especially a Resistance Temperature Detector (RTD), for example, a sensor element equipped with connection wires and applied on a substrate is used, wherein the rear face of the substrate is, as a rule, coated with metal. Used as sensor elements, in such case, are so-called resistance elements, for example, in the form of platinum elements, obtainable commercially, for instance, under the designations PT10, PT100, and PT1000.

In the case of temperature sensors in the form of thermocouples, in turn, the temperature is determined by a thermovoltage, which occurs between unilaterally connected thermocouple wires of different materials. Applied as temperature sensor for temperature measurement are usually thermocouples of the DIN standard IEC584, e.g., thermocouples of type K, J, N, S, R, B, T or E. However, also other material pairs, especially such having a measurable Seebeck effect, are possible.

The accuracy of temperature measurement depends sensitively on the thermal contacts and the heat conduction reigning in each case. The heat flows between the medium, the containment, in which the medium is located, the thermometer, the protective tube and the process environment all play deciding roles. For a reliable temperature determination, it is important that the particular temperature sensor and the medium be located essentially in thermal equilibrium, at least for a certain time required for registering temperature.

In this connection, it is, on the one hand, advantageous that the temperature sensor be immersed in the particular medium by means of a protective tube, since, in this way, a comparatively good coupling can be achieved between the medium and the temperature sensor. Depending on the temperature range of the medium and a temperature difference between the temperature of the medium and the ambient temperature, there can, however, also be undesired heat conduction by means of the measuring insert and protective tube from the medium to components arranged outside of the process, or vice versa. In both cases, the undesired heat conduction leads to a heat transfer error and therewith to a considerable lessening of the accuracy of measurement. These problems are important especially in the case of cryogenic applications, thus, low temperature applications.

SUMMARY

Therefore an object of the invention is to improve the accuracy of measurement in the case of the application of field devices with protective tubes.

The object is achieved by the protective tube and the arrangement according to the present disclosure.

As regards the protective tube, the object of the invention is achieved by a protective tube for an apparatus for determining and/or monitoring at least one process variable of a medium in a containment, comprising a tubular, especially cylindrical, element, which serves for receiving a measuring insert of the device, and wherein the tubular element is securable to the containment in such a manner that the tubular element extends, at least partially, inwardly into an internal volume of the containment. According to the invention, the tubular element includes an inlet opening and an outlet opening, wherein the inlet opening and the outlet opening are arranged on mutually oppositely lying sides of the tubular element.

Both the inlet opening and the outlet opening are located preferably in a protective tube region, which is located within the containment when the protective tube extends into the containment. Thus, medium can enter and leave an internal volume of the protective tube through the openings. By medium flowing through at least a part of the internal volume of the protective tube, effects connected with heat conduction can be significantly reduced.

The containment is, for example, a container or a pipeline. In the case of a pipeline flowed through by medium, it is, for example, advantageous that the inlet opening in the pipeline secured state of the protective tube faces upstream, and the outlet opening in the pipeline secured state of the protective tube faces downstream.

In an embodiment of the protective tube, the inlet opening and/or the outlet opening are arranged and/or embodied in such a manner that the measuring insert is flowed around by the medium in the tubular element introduced state of the measuring insert. The flowing around the measuring insert within the protective tube leads to an improved measuring performance as regards the determining and/or monitoring of the process variable.

Another embodiment includes that the inlet opening and/or the outlet opening are arranged and/or embodied in such a manner that in the containment secured state of the tubular element and in the tubular element introduced state of the measuring insert, a predeterminable stagnation pressure reigns in the region of the inlet opening. The inlet opening forms accordingly, in such case, a stagnation point for the medium. This embodiment is especially advantageous in the case of use of a containment in the form of a pipeline. However, also in the case of containers, a stagnation pressure can occur in the region of the inlet opening, for example, in the case of cryogenic media.

An embodiment of the protective tube includes that the inlet opening and/or the outlet opening is/are arranged in the region of a lateral surface of the tubular element.

At least one of the openings can also be arranged in the region of an end face of the tubular element. In this way, the measuring element is flowed around from the inlet opening, which is preferably arranged in the region of the lateral surface of the tubular element, to the outlet opening arranged at the end face. Typically, the sensor element of the particular measuring insert is arranged in the region of the end face of the protective tube, after the measuring insert has been introduced in the protective tube. By these measures, it can, thus, be assured that the measuring element is not influenced by heat transfer.

Thus, it is, furthermore, advantageous that the outlet opening is arranged in a first region of the tubular element, which in the containment secured state of the tubular element of faces the medium.

It is likewise advantageous that the inlet opening is arranged in a second region of the tubular element, which in the containment secured state of the tubular element is toward the wall of the containment. It is likewise an option to provide the protective tube with a plurality of positions, especially positions at different locations. Preferably in such case, the outlet opening is the opening farthest from the wall of the containment.

An embodiment includes that the tubular element is closed in the region of an end face, which in the containment secured state of the tubular element faces the medium. In such case, the outlet opening is arranged in the region of the lateral surface of the tubular element.

It is, however, likewise an option that the protective tube, especially the tubular element, is open in the region of end face facing the medium. In such case, the outlet opening is advantageously arranged in the region of the end face, which faces the medium in the containment secured state of the tubular element.

Another embodiment provides that the end face of the tubular element is chamfered, and, especially, when the containment is a pipeline or a measuring tube, the protective tube is securable in such a manner to the containment that the chamfering in the containment secured state of the protective tube faces downstream. Such a measure can increase the stagnation pressure.

Finally, in an embodiment, the protective tube further comprises a securement insert for securing a thermometer in a port of a measuring tube, and

- a holding element for securing the thermometer to the securement insert, and
- a stop, which is embodied to prevent a rotary movement of the thermometer relative to the measuring tube, wherein the securement insert is embodied and/or arranged in such a manner that the securement insert is movable in parallel with a longitudinal axis of the port. Such a securement insert serves for preventing disadvantageously acting, vortex induced vibrations and takes into consideration especially the special problems associated with applications at low temperatures, such as, for example, different coefficients of thermal expansion of the different components of the thermometer or heat conduction effects. In this connection, reference is made to the as yet unpublished German patent application No. 102020109424.8, to which comprehensive reference is taken in the context of the present invention.

The object of the invention is achieved, furthermore, by an arrangement for determining and/or monitoring a process variable of a medium in a containment, comprising an apparatus for determining and/or monitoring the process variable with a measuring insert, which serves for determining and/or monitoring the process variable, and a protective tube of the invention according to at least one of the described embodiments.

The apparatus is, for example, a field device having a sensor unit and an electronics. Especially involved is a thermometer for determining and/or monitoring temperature with a temperature sensor, for example, a temperature sensor in the form of a resistance element or thermocouple.

In an embodiment of the arrangement, the protective tube and/or the apparatus is/are embodied in such a manner that the protective tube and/or the apparatus is/are securable in a receiving nozzle or port of the containment.

In the case of a containment in the form of a pipeline, it is advantageous in this regard, for example, that the arrangement further comprises a measuring tube for conveying the medium, wherein the measuring tube includes a pipeline section and a port for receiving the apparatus, and wherein a longitudinal axis of the port has a predeterminable angle, especially an angle of essentially 90°, to a longitudinal axis of the pipeline section. The measuring tube is, in such case, a T piece, for example. Alternatively, however, also other configurations can be used for the measuring tube, such as, for example, an embodiment in the form of an elbow.

Another embodiment includes that the protective tube is introducible in the containment in such a manner that an installed angle between a longitudinal axis of the protective tube and an imaginary, horizontal line lies in the range between 0° and −90°. In the case of introducing the protective tube and/or the apparatus by means of a port, then, for example, an angle between a longitudinal axis of the port and the imaginary horizontal line lies in an interval between 0° and −90°. The protective tube and the apparatus are accordingly introduced into the containment in such a manner that, in the installed state of the protective tube and the apparatus, an end region of the protective tube and the apparatus toward the medium is highest, with reference to a vertical imaginary line.

Finally, it is to be noted that the embodiments described in connection with the protective tube of the invention can be applied mutatis mutandis also to the apparatus of the invention and vice versa.

BRIEF DESCRIPTION OF THE DRAWINGS

The invention will now be explained in greater detail based on the appended drawing, the figures of which show as follows.

DETAILED DESCRIPTION

Figures 1, 2:
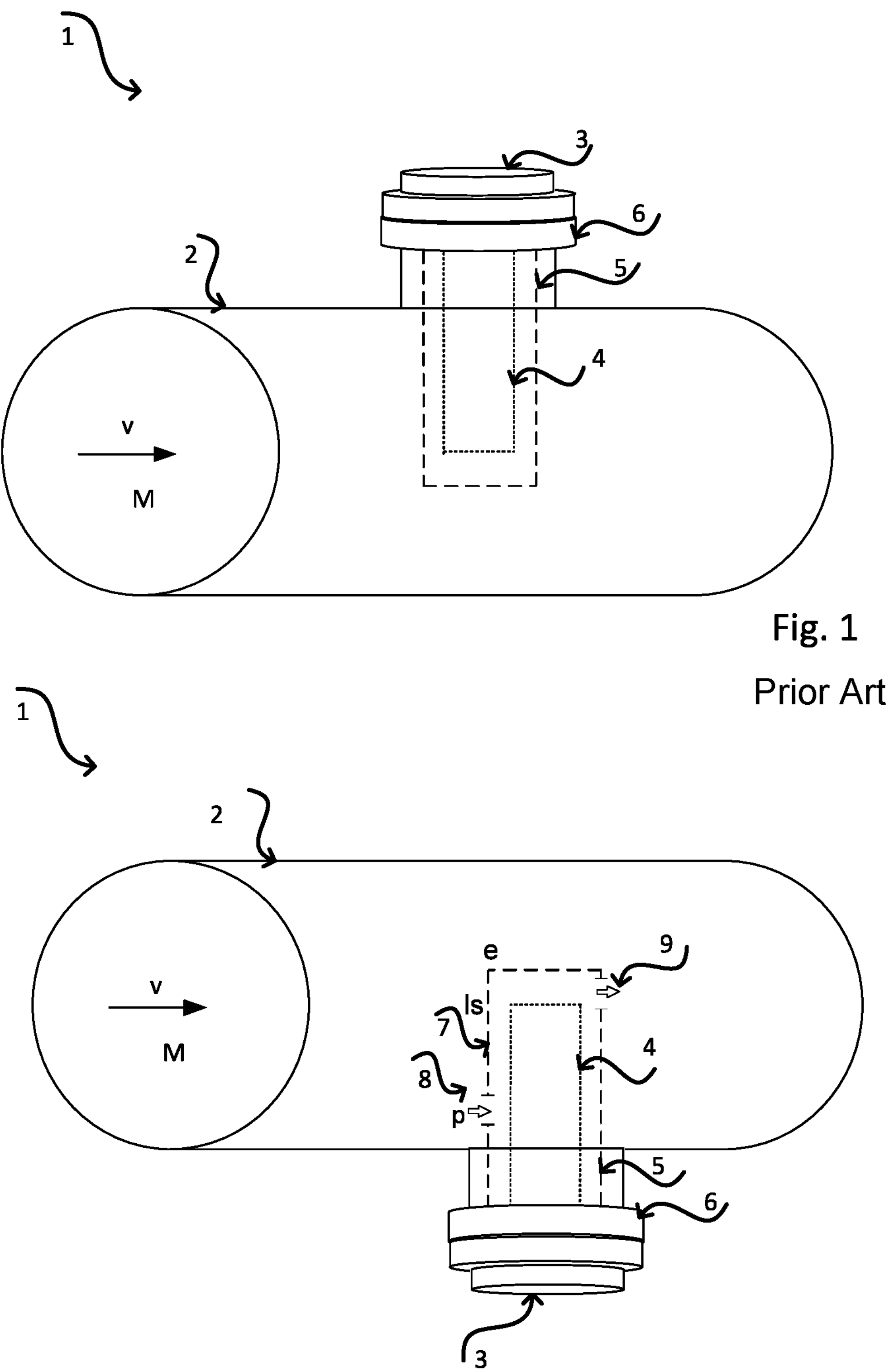
FIG. 1 shows a thermometer with protective tube according to the state of the art.
FIG. 2 shows a first embodiment of an arrangement according to the present disclosure having a protective tube with closed end.

In the figures, equal elements are provided with equal reference characters. Without intending to limit the general applicability of the idea underlying the invention, the following description concerns measuring arrangements for determining and/or monitoring temperature. Likewise, the following description concerns, by way of example, the case of a containment in the form of a pipeline. Of course, a protective tube of the invention, can, however, also be applied for other types of containments.

FIG. 1 shows an arrangement 1 for determining and/or monitoring temperature T of a medium M located in a pipeline 2 and flowing through the pipeline 2 with a flow velocity v. Arrangement 1 includes an apparatus 3 for determining and/or monitoring temperature T and provided in the form of a thermometer having a measuring insert 4, in which a temperature sensor (not shown) is arranged. Measuring insert 4 is arranged in a protective tube 5, which is introduced into the pipeline 2 by means of a port 6 provided on the pipeline 2.

In order to achieve an as high as possible accuracy of measurement, for example, for applications in the low, or cryogenic, temperature field, corresponding arrangements are typically shielded from the environment with insulation. In spite of this, undesired heat conduction can occur in the case of such arrangements, from the environment to the measuring insert. In such case, the securement means, as a rule, composed of metal, for securing the thermometer 3 to the pipeline 2 plays a deciding role. Correspondingly, the measured value ascertained for the temperature is usually too high.

In the case of applications at cryogenic temperatures, additionally, due to partial vaporization of the medium due to the large temperature differences between temperature of the measuring insert and that of the medium, gas bubbles can form. The gas bubbles move upward and collect in the internal volume of the port. The port is then less or no longer flowed around by liquid medium, in which case it becomes the source of an additional undesired heat input in the case of temperature determination by means of the measuring insert.

Such problems can be eliminated by means of a protective tube 5 of the invention. A first embodiment of an arrangement 1 with a protective tube 5 of the invention is displayed in FIG. 2.

The protective tube 5 includes a tubular element 7 with an inlet opening 8 and an outlet opening 9, which are arranged on mutually oppositely lying sides of the tubular element 7. Inlet opening 8 faces upstream relative to the flow v of the medium M in this example of an embodiment, while the outlet opening 9 faces downstream. Tubular element 7 is closed on its end e and the two openings 8,9 are arranged in the region of the lateral surface ls of the tubular element 7. In such case, the inlet opening 8 is in a region near a wall of the pipeline 2, while the outlet opening 9 is in a region near the end face e. In the region of the inlet opening 8, a stagnation pressure p occurs, from which a pressure difference results within the protective tube 5. A forced convection takes place and, associated therewith, a flow through an internal volume of the protective tube 5 and the measuring insert 4. In this way, heat brought from the outside into the process is effectively removed. This, in turn, leads to a significantly increased accuracy of measurement.

By the optional installation from below, thus, with an angle of essentially 90° between an imaginary horizontal line and a longitudinal axis of the port 6, or protective tube 4, possibly occurring gas bubbles can rise and exit from the protective tube 5 through the outlet opening 9. The occurring vaporization processes have greater heat transfer coefficients than the forced convection of the medium. The removing of the gas bubbles effects, thus, a highly effective cooling of the measuring insert. Ideally, disadvantageous effects of heat introduced from the environment can essentially be completely prevented, because pressure and temperature are directly linked with one another via the vapor pressure curve. This measure cares accordingly for a further increasing of the accuracy of measurement in the case of temperature determination.

Figure 3:
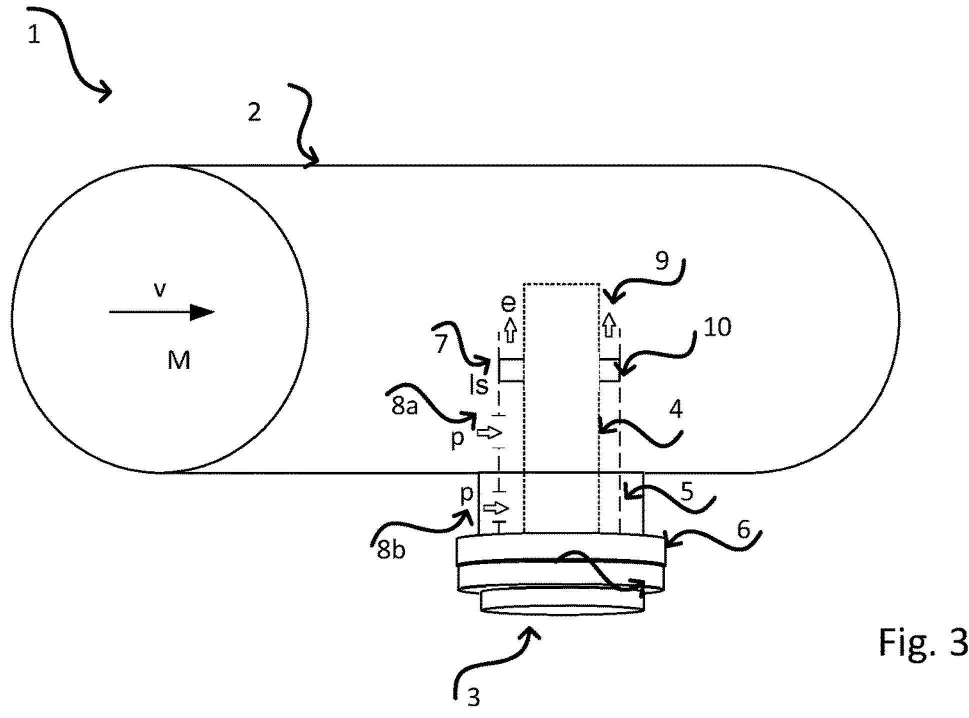
FIG. 3 shows a second embodiment of an arrangement according to the present disclosure having a protective tube with open end.

Another example of an embodiment of an arrangement 1 of the invention is presented in FIG. 3. In contrast with the embodiment of FIG. 2, in the case of FIG. 3, the tubular element 7, thus, the protective tube 5, is open in the region of the end face e and the measuring insert 4 extends, by way of example, out of the protective tube 5. Measuring insert 4 is, thus, made longer than the protective tube 5. The outlet opening 9 is located, thus, in the region of the end face e. Moreover, the protective tube has 5, in such case, two inlet openings 8*a*, 8*b*. The second inlet opening 8*b* is located in the state mounted in the pipeline 2 in the region of an internal volume of the port 6. This further lessens negative effects of gas bubbles.

Because the measuring insert 4 extends out of the protective tube 5, the measuring insert 4 is, especially in the region, in which the temperature sensor is located, directly flowed around by the flowing medium M. Also by these measures, the accuracy of measurement of an arrangement of the invention is increased.

For preventing vortex induced vibrations, the arrangement 1 further includes a securement insert 10. This includes at least one opening (not shown), in order that the medium M can flow through the internal volume of the protective tube 5 and leave the protective tube 5 through the outlet opening 9.

Figure 4:
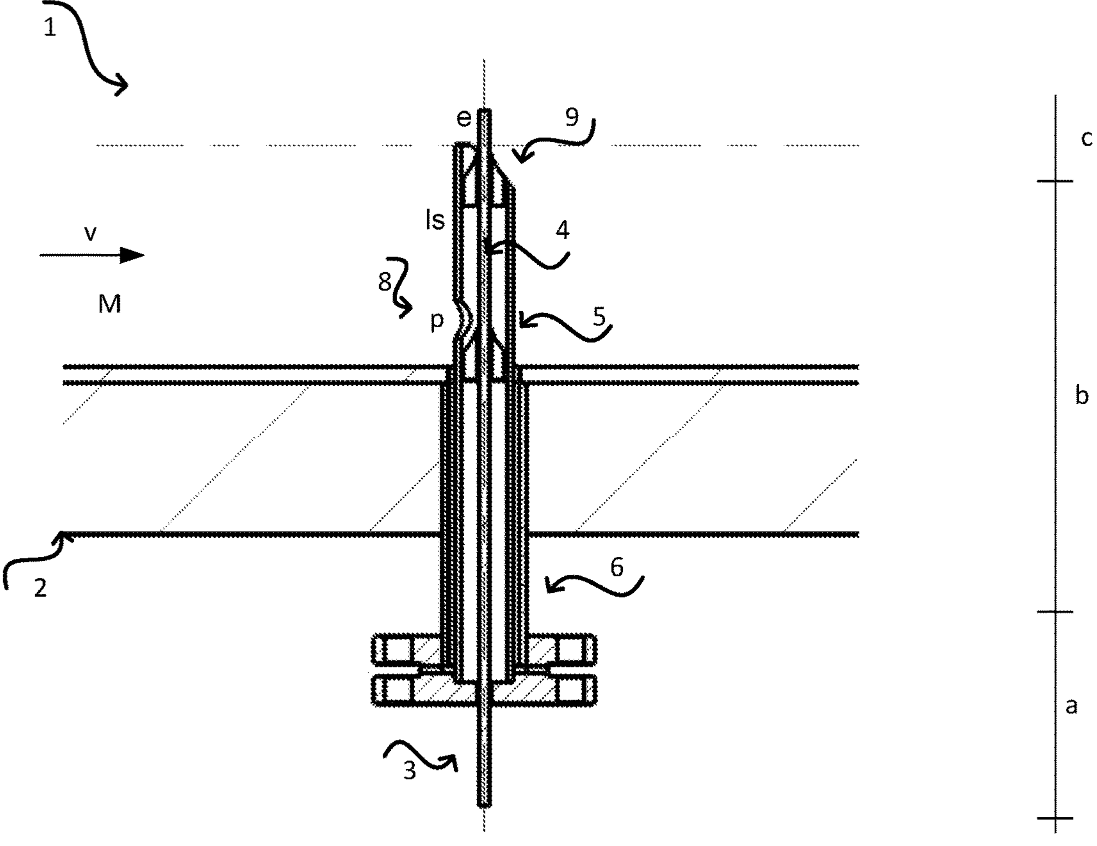
FIG. 4 shows a third embodiment of an arrangement according to the present disclosure having a protective tube with open end and chamfering.
Figure 5:
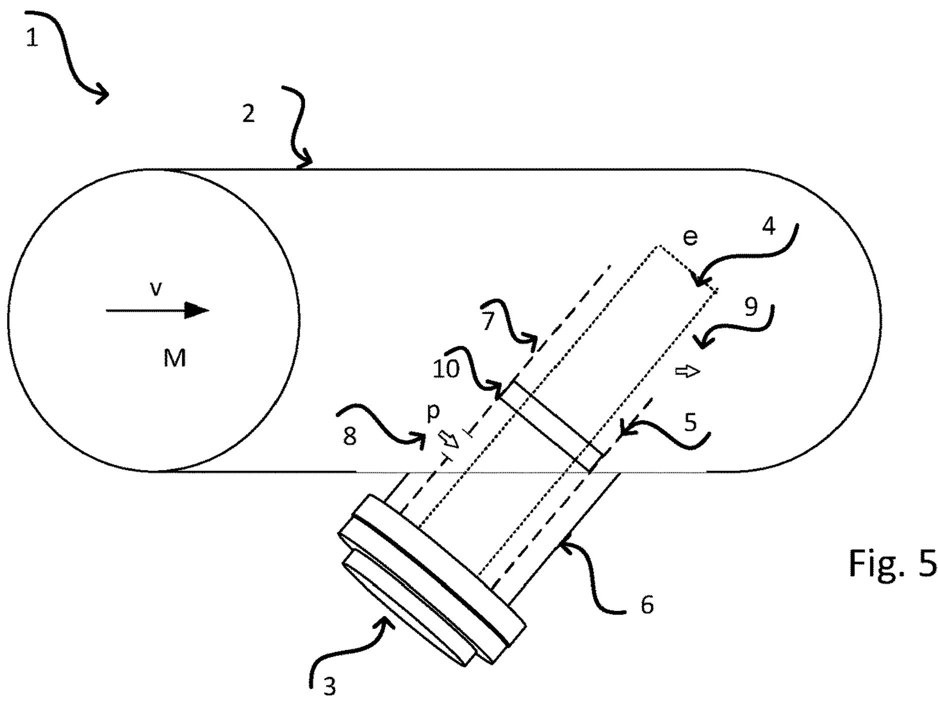
FIG. 5 shows a fourth embodiment of an arrangement according to the present disclosure having a protective tube with open end and chamfering.

In the case of the embodiment of FIG. 4, the end face e is additionally chamfered, wherein the chamfering faces downstream. Also, an installation at an angle other than the 90° of the preceding figures is possible. Such an embodiment is shown by way of example in FIG. 5. Additionally, instead of an arrangement in the form of a T, also an arrangement in the form of an elbow can be implemented. Let it, finally, also be noted that other embodiments also can have more than one outlet opening 9.

Figure 6:
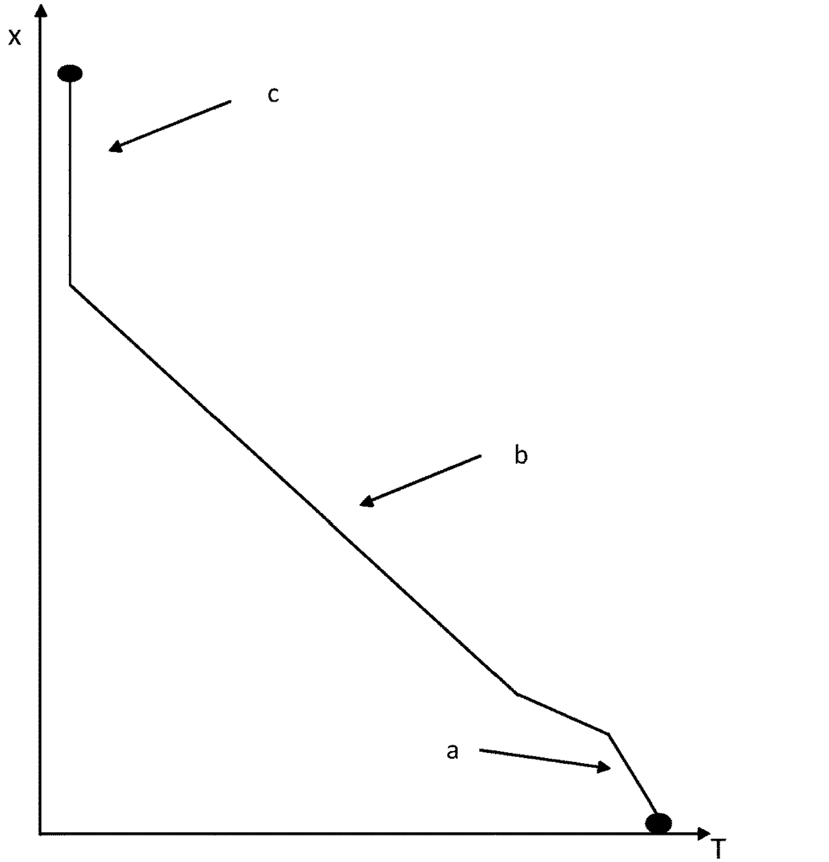
FIG. 6 shows a schematic graph of temperature profile for a protective tube according to the present disclosure.

FIG. 6 shows, finally, a schematic view of a temperature profile T as a function of position x in the direction of the longitudinal axis in the case of a vertical installation of the apparatus 3 with the protective tube 5, such as shown in FIG. 4. FIG. 4 shows a vertical line, which allows an associating of the regions a, b, c of the temperature profile with corresponding regions of the arrangement 1. Region a is the region of the port 6, thus, the region of the process connection. Region b is the region within the protective tube 5 and region c is the region facing the medium M, especially that region, where the measuring insert 4 extends out from the protective tube 5.

While in the region a of the temperature profile, heat conduction is dominant within the process connection, there is a cooling by convection and vaporization in the region b. In region c, the temperature profile is almost independent of the exact position x and the temperature T measured by means of the thermometer 3 corresponds essentially to the temperature of the medium M

The invention claimed is:

1. An arrangement for determining and/or monitoring a process variable of a medium in a containment, the arrangement comprising:

an apparatus configured to determine and/or monitor the process variable in the containment, the apparatus comprising:

a measuring insert, which serves for determining and/or monitoring the process variable; and a protective tube comprising a tubular element configured to receive the measuring insert, wherein the tubular element is securable to the containment such that the tubular element extends, at least partially, inwardly into an internal volume of the containment, wherein the tubular element includes an inlet opening and an outlet opening, wherein the inlet opening and the outlet opening are arranged on mutually oppositely lying sides of the tubular element, and wherein the inlet opening and/or the outlet opening is/are arranged in a region of a lateral surface of the tubular element, and wherein the protective tube is introducible into the containment such that an installed angle between a longitudinal axis of the protective tube and an imaginary, horizontal line lies in the range between 0° and −90°.

2. The arrangement of claim 1, wherein the inlet opening and/or the outlet opening are arranged and/or configured such that the measuring insert is flowed around by the medium when the tubular element is secured to the containment.

3. The arrangement of claim 1, wherein the inlet opening and/or the outlet opening are arranged and/or embodied such that, when the tubular element is secured to the containment, a predeterminable stagnation pressure prevails in a region of the inlet opening.

4. The arrangement of claim 1, wherein the outlet opening is arranged in a first region of the tubular element, and wherein, when the tubular element is secured to the containment, the first region faces the medium.

5. The arrangement of claim 1, wherein the protective tube and/or the apparatus is/are embodied such that the protective tube and/or the apparatus is/are securable in a receiving nozzle or port of the containment.

6. The arrangement of claim 1, wherein the inlet opening is arranged in a second region of the tubular element, and wherein, when the tubular element is secured to the containment, the second region is toward a wall of the containment along which the medium flows.

7. The arrangement of claim 6, wherein the inlet opening is closer to the wall of the containment than the outlet opening when the tubular element is secured to the containment.

8. The arrangement of claim 1, wherein the tubular element is closed in a region of an end face, which faces the medium when the tubular element is secured to the containment.

9. The arrangement of claim 8, wherein the outlet opening is arranged in the region of the end face, which faces the medium when the tubular element is secured to the containment.

10. An arrangement for determining and/or monitoring a process variable of a medium in a containment, the arrangement comprising:

an apparatus configured to determine and/or monitor the process variable in the containment, the apparatus comprising:

a measuring insert, which serves for determining and/or monitoring the process variable; and a protective tube comprising a tubular element configured to receive the measuring insert, wherein the tubular element is securable to the containment such that the tubular element extends, at least partially, inwardly into an internal volume of the containment, wherein the tubular element includes an inlet opening and an outlet opening, wherein the inlet opening is arranged in a region of a lateral surface of the tubular element, wherein the outlet opening is arranged in an open distal end face of the tubular element, which end face faces the medium when the tubular element is secured to the containment, and wherein the protective tube is introducible into the containment such that an installed angle between a longitudinal axis of the protective tube and an imaginary, horizontal line lies in the range between 0° and −90°.

11. The arrangement of claim 10, wherein the measuring insert extends beyond the protective tube, and wherein the protective tube includes a securement insert adapted to secure the measuring insert within the protective tube such that vortex induced vibrations are mitigated.

12. The arrangement of claim 10, wherein the end face of the tubular element is chamfered, and the protective tube is securable to the containment such that the chamfering faces downstream when the tubular element is secured to the containment.

* * * * *